United States Patent [19]

Dammann et al.

[11] Patent Number: 4,776,669

[45] Date of Patent: Oct. 11, 1988

[54] OPTICAL PATH SENSOR INCLUDING A FILTER

[75] Inventors: Hans O. B. Dammann, Tangstedt; Reiner U. Orlowski, Quickborn, both of Fed. Rep. of Germany

[73] Assignee: U.S. Philips Corporation, New York, N.Y.

[21] Appl. No.: 937,599

[22] Filed: Dec. 3, 1986

[51] Int. Cl.$^4$ .................... G02B 27/44; G02B 26/02
[52] U.S. Cl. .................... 350/162.19; 350/96.19; 350/162.17; 356/395
[58] Field of Search .................... 350/162.19, 162.23, 350/162.24, 96.19, 162.17; 356/395

[56] References Cited

U.S. PATENT DOCUMENTS

| | | | |
|---|---|---|---|
| 3,482,107 | 12/1969 | Hock | 350/162.17 |
| 3,586,665 | 6/1971 | Weyrauch | 356/395 |
| 4,051,367 | 9/1977 | Sayce et al. | 356/395 |
| 4,091,281 | 5/1978 | Willhelm et al. | 350/162.17 |
| 4,585,307 | 4/1986 | Dammann et al. | 350/162.23 |
| 4,649,351 | 3/1987 | Veldkamp et al. | 350/162.17 |
| 4,679,901 | 7/1987 | Dammann et al. | 350/96.19 |

Primary Examiner—Bruce Y. Arnold
Assistant Examiner—Terry S. Callaghan
Attorney, Agent, or Firm—F. Brice Faller

[57] ABSTRACT

An optical path sensor including a filter through which passes a radiation beam comprising light of at least two wavelengths and which filter, as it is moved perpendicularly to the direction of the optical radiation beam, causes the attenuations for the beam components of different wavelengths to change in a different ratio. In a filter constructed in a simple manner with low-cost elements two phase gratings are arranged one after the other in the beam direction, only one of the gratings being movable perpendicularly to the beam direction and in that the zero-order diffraction beams are directed towards a detector.

9 Claims, 2 Drawing Sheets

OPTICAL PATH SENSOR INCLUDING A FILTER

BACKGROUND OF THE INVENTION

The invention relates to an optical path sensor including a filter through which a radiation beam comprising light of at least two wavelengths passes. As the filter is moved perpendicularly to the direction of the optical radiation beam, it causes the attenuations for the beam components of different wavelengths to change in a different ratio.

In an arrangement of this type known from EP-A-93.273 the filter comprises at least two composite filter elements arranged one after the other in the direction of movement, each element only transmitting light of one wavelength. The path dependence is obtained in that, when the filter is moved, different relative portions of the light components of different frequencies reach a detector.

Optical wavelength filters are costly elements. The manufacturing costs of the known elements composed of different filters are considerable.

SUMMARY OF THE INVENTION

It is an object of the invention to provide a path-sensor which is simply constructed from low-cost elements.

The filter comprises two phase gratings arranged one after the other in the beam direction, only one of the gratings being movable perpendicularly to the beam direction. The zero-order diffraction beams are directed towards a detector.

Phase gratings are elements having a simple construction and they can be manufactured at low cost. Such elements are, for example, known from DE-OS No. 33 03 623, to which U.S. Pat. No. 4,585,307 corresponds.

If two phase gratings are moved with respect to each other, the amount of light diffracted in the zero-order generally changes to a different extent for different wavelengths. For example, the quotient of the detected light intensities of two light components of different wavelengths may be used as a measure of the movement of the two filters. Particularly suitable for this purpose are phase gratings which, when moved, influence light of different wavelengths to a considerably different extent.

If two transmission gratings are used, the optical radiation is launched from a transmitting fibre into a receiving fibre through the gratings.

A single fibre can be used both for transmitting and for receiving radiation if one of the gratings is a reflection grating.

Highly frequency-selective grating arrangements can be obtained particularly when using single-step gratings. Preferably, the two gratings have grating periods and equal step heights. Such gratings can be formed in such a manner that for beams of different wavelengths the difference in attenuation is as large as possible.

A very advantageous embodiment in which light of a wavelength $\lambda_1$ is transmitted substantially without attenuation throughout the range of movement whilst the attenuation of the light of the second wavelength $\lambda_2$ is greatly dependent on the movement is characterized in that the ratio between the wavelengths $\lambda_1$ and $\lambda_2$ of two light components of the radiation beam is at least approximately $$\lambda_1/\lambda_2 = \frac{2k \pm 1}{2k}$$

in which k is a positive or negative integer and in that the step heights d of the two-step phase gratings are each chosen to be $$d = k \cdot \lambda_1 \cdot \frac{1}{n-1}$$

in which n is the refractive index of the phase grating material.

DETAILED DESCRIPTION OF THE PREFERRED EMBODIMENT

Figure 1:
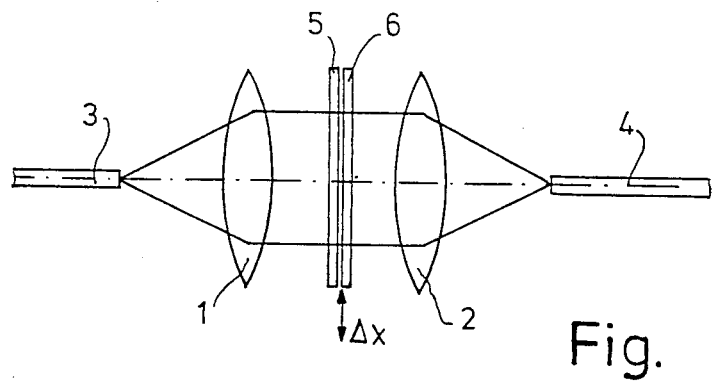
FIG. 1 shows the basic construction of an optical path sensor having two transparent phase gratings.

In FIG. 1 the lenses 1 and 2 image the transmission fibre 3 and the receiving fibre 4 onto each other. Between the two lenses a parallel beam passes through the phase gratings 5 and 6, the phase grating 6 being movable perpendicularly to the beam direction over $\Delta x$. The phase grating consisting of the two subgratings 5 and 6 diffracts the light of the intensity $I_s$ from the transmitting fibre 3 in the zero-order $I_{E0}$, the light of this order being launched into the receiving fibre 4. The light intensity $I_{E0}$ is dependent on the movement $\Delta x$:

$$I_{E0} = I_s f(\Delta x)$$

The function $f(\Delta x)$ depends on the geometrical structures of the two subgratings. Geometrical structures which are very suitable for use in optical path sensors are those which provide a minimal attenuation for light of one wavelength and a strong attenuation for light of another wavelength. If $I_{E0}(\lambda_1)$ and $I_{E0}(\lambda_2)$ are the intensities of the zeri-order light of wavelengths $\lambda_1$ and $\lambda_2$ launched into the receiving fibre, their quotient is an unambiguous measure of the relative movement $\Delta x$ of the two gratings 5 and 6. Fluctuating attenuations of the transmission fibre 3 and the receiving fibre 4 as well as those of connectors, if any, do not have any effect on the measuring result, because such attenuations influence the light components of both wavelengths by the same multiplication factor. On the other hand, the influence of the gratings 5 and 6 which is utilized for measuring purposes differs substantially for both wavelengths.

Figure 2:
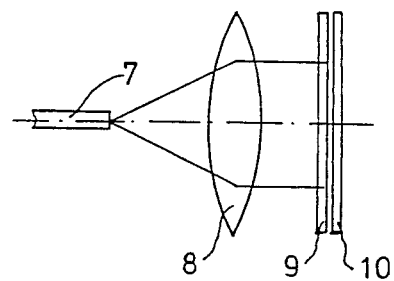
FIG. 2 shows an embodiment with a transparent phase grating and a reflection grating.

FIG. 2 shows a modified arrangement in which the fibre 7 is used for simultaneously passing the transmitted and the received beam. By means of the lens 8 light of the intensity $I_S$ is passed as a parallel beam through the transparent phase grating 9 to the reflection grating 10. From this grating the zero-diffraction order $I_{E0}$ is returned to the fibre 7 via the lens 8.

As compared with the embodiment of FIG. 1 only one lens is required. The path sensor is to be connected only to a single fibre. In addition, fewer adjustments are required.

Figure 3:
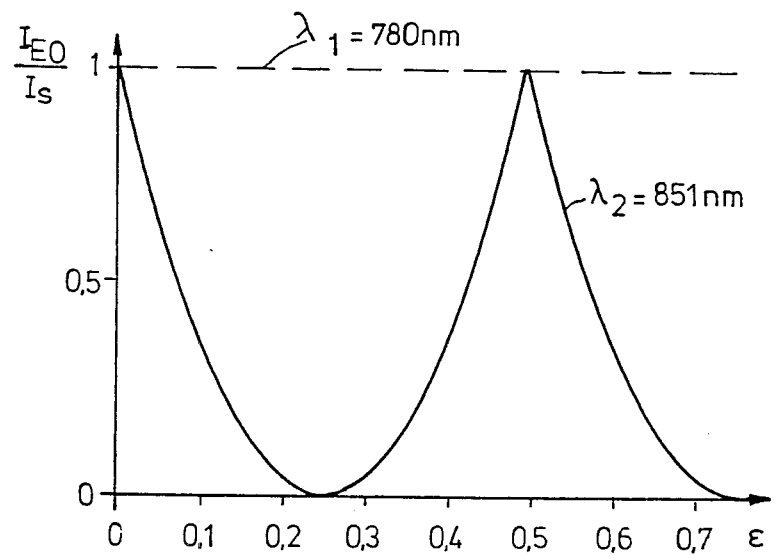
FIG. 3 shows the light intensities of two optical beams of different wavelengths, after passing through the phase gratings, as a function of the movement of one of the gratings.

In principle the two gratings 5 and 6 or 9 and 10 may have any construction. However, it should be ensured that the quotient of the function f($\Delta x$) for the wavelengths $\lambda_1$ and $\lambda_2$ varies to a maximum extent, dependent on the path variation. Particularly single-step gratings can be suitably dimensioned in a simple manner. In addition such gratings can easily be manufactured. For the gratings according to FIG. 4 the relative intensities of the received zero-order beams are as shown in FIG. 3 for the light components of the wavelengths $\lambda_1$ and $\lambda_2$ in dependence upon the relative movement $$\epsilon = \frac{\Delta k}{\Lambda} \; (\Lambda = \text{grating period}).$$

Light of the wavelength $\lambda_1 = 780$ nm reaches the receiving fibre in an unattenuated manner. However, for a relative movement from 0 to $\epsilon = 0.25$ the light of the second wavelength $\lambda_2 = 851$ nm varies from a value of 100% to 0%.

Figure 4:
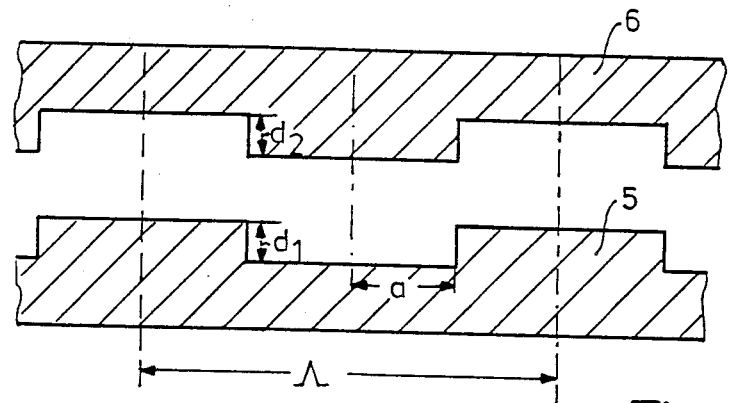
FIG. 4 shows the structure of two very suitable phase gratings.

The optimum situation according to FIG. 3 can be at least approximately achieved by means of a grating arrangement as shown in FIG. 4. The step height of the first grating 5 with the grating period $\Lambda$ is $d_1$ and that of the second grating with the same grating period is $d_2$. Half the width of a grating step or a grating interstice is equal to the value a for both subgratings.

Figure 5:
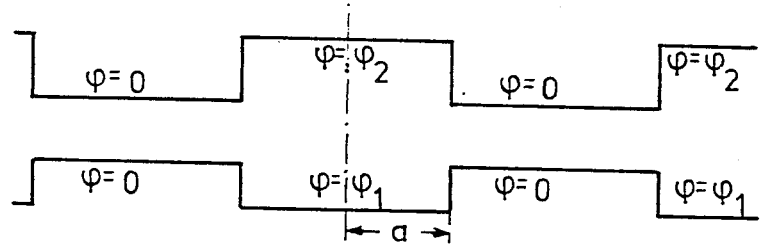
FIG. 5 shows the phase angles of the gratings according to FIG. 4 for a movement "0".

FIG. 5 shows the variation of the phase difference when the gratings shown in FIG. 4 are transmission gratings:

$$\phi_1 = -2\pi(n-1)\frac{d_1}{\lambda} \text{ and } \phi_2 = 2\pi(n-1)\frac{d_2}{\lambda}$$

In the above equations n is the refractive index of the material used for the gratings and $\lambda$ is the wavelength of the light in vacuo.

Figure 6:
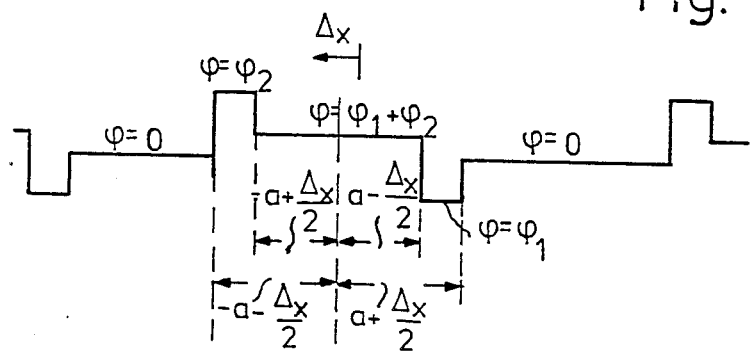
FIG. 6 shows the phase angles of the gratings according to FIG. 4 in the case of a relative movement "$\Delta x$".

FIG. 6 shows the overall phase $\phi = \phi_1 + \phi_2$ resulting from the two gratings in the case of mutual movement of the gratings over the path $\Delta x$.

The resultant diffractive efficiency $\eta_0$ for the zero-order diffraction beam in the case of a grating arrangement according to FIG. 4 is:

$$\begin{aligned}\eta_0 = & \; 1 + (8c^2 - 4c)[1 - \cos(\phi_1 + \phi_2)] + \\ & 2\epsilon[\cos\phi_2 + \cos\phi_2 - \cos(\phi_1 + \phi_2) - 1] + \\ & 2\epsilon^2[2 + \cos(\phi_1 + \phi_2) + \cos(\phi_1 - \phi_2) - \\ & 2\cos\phi_1 - 2\cos\phi_2]\end{aligned}$$

Herein, $a/\Lambda = c$. Within the range of movement $|\epsilon| < \Lambda/4$ there is an unambiguous relationship between $\eta_0$ and $\epsilon$. The function f($\Delta x$) then corresponds to the value $\eta_0$ and is generally different for the wavelengths $\lambda_1$ and $\lambda_2$. If $\phi_1$ is chosen to be $-\phi_2$ this results in $$\begin{aligned}\eta_0 = & \; 1 + 4\epsilon(\cos\phi_2 - 1) + 2\epsilon^2[3 + \cos(2\phi_2) - 4\cos\phi_2] \\ = & \left(1 - 4\epsilon\sin^2\frac{\phi_2}{2}\right)^2.\end{aligned}$$

$\sin^2(\phi_2/2)$ may be dictated such that for a wavelength $\lambda_1$ its value is 0 whereas it assumes the maximum value 1 for another wavelength $\lambda_2$. This is the case if the two wavelengths $\lambda_1$ and $\lambda_2$ satisfy the following condition:

$$\frac{\lambda_1}{\lambda_2} = \frac{2k \pm 1}{2k}$$

Here k is a positive or negative integer to be chosen as small as possible. The step height d of the gratings must then assume the value:

$$d = k\lambda_1/n - 1.$$

The characteristic curve of FIG. 3 were found for the wavelengths $\lambda_1 = 780$ nm and $\lambda_2 = 851$ nm at a value k=6. In practice, the useful maximum range of movement is $\Delta x = 25$ $\mu$m for a grating period $\Lambda = 100$ $\mu$m.

The wavelengths $\lambda_1 = 780$ nm and $\lambda_2 = 851$ nm provide an optimum sensitivity, but slight deviations from the optimum values for the wavelengths $\lambda_1$ and/or $\lambda_2$ are acceptable.

In principle, the same dimensioning rules may be applied when using a sensor construction as shown in FIG. 2. However, it is to be noted that the radiation passes through the first subgrating twice. Consequently considerably smaller step heights d result for the two subgratings.

What is claimed is:

1. An optical displacement sensor comprising
   means for delivering a sensing beam of radiation, said sensing beam comprising a first component with a first wavelength and a second component with a second wavelength,
   a compound phase grating comprising two subgratings arranged one behind the other in the path of the sensing beam, said phase grating transmitting light in the zero-order, one of said subgratings being movable perpendicularly of the beam direction, the intensity of the zero-order light being dependent on the movement of the subgrating, said movement representing the displacement to be sensed, said movement having a maximum effect on the intensity of the first wavelength component of the zero-order beam and a minimum effect on the intensity of the second wavelength component of the zero-order beam,
   means for receiving said zero-order beam formed by the compound grating out of the sensing beam.

2. An optical displacement sensor as claimed in claim 1, characterized in that the two subgratings are transmission gratings.

3. An optical displacement sensor as claimed in claim 1, characterized in that one subgrating is a transmission grating and the other is a reflection grating.

4. An optical displacement sensor as claimed claim 1, characterized in that at least one of the subgratings is a stepped grating.

5. An optical displacement sensor as claimed in claim 4, characterized in that at least one subgrating is a single-step grating.

6. An optical displacement sensor as claimed in claim 5, characterized in that the two subgratings are single-step gratings.

7. An optical displacement sensor as claimed in claim 6, characterized in that the subgratings have the same grating period.

8. An optical displacement sensor as claimed in claim 7, characterized in that the step heights of the two single-step gratings are equal.

9. An optical displacement sensor as claimed in claim 8, characterized in that the ratio between the wavelengths $\lambda_1$ and $\lambda_2$ of two light components of the radiation beam is approximately $$\lambda_1/\lambda_2 = \frac{2k \pm 1}{2k}$$

in which k is a positive or negative integer and in that the step heights d of the phase gratings are each chosen to be $$d = k \cdot \lambda_1 \cdot \frac{1}{n-1}$$

in which n is the refractive index of the phase grating material.

* * * * *